US011151288B2

United States Patent
An et al.

(10) Patent No.: US 11,151,288 B2
(45) Date of Patent: *Oct. 19, 2021

(54) METHOD AND APPARATUS FOR PROCESSING BIOMETRIC INFORMATION IN ELECTRONIC DEVICE

(71) Applicant: Samsung Electronics Co., Ltd., Suwon-si (KR)

(72) Inventors: Teain An, Hwaseong-si (KR); Taeho Kim, Seoul (KR); Hyungjoon Kim, Hwaseong-si (KR); Seulhan Park, Yongin-si (KR); Jonghoon Park, Suwon-si (KR); Heejun You, Anyang-si (KR); Yangsoo Lee, Yongin-si (KR); Moonsu Chang, Suwon-si (KR); Jinho Hyeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,826

(22) Filed: Sep. 28, 2017

(65) Prior Publication Data
US 2018/0018477 A1    Jan. 18, 2018

Related U.S. Application Data

(63) Continuation of application No. 14/619,731, filed on Feb. 11, 2015, now Pat. No. 9,792,460.

(51) Int. Cl.
*H04L 29/06* (2006.01)
*G06F 12/14* (2006.01)
(Continued)

(52) U.S. Cl.
CPC ............. *G06F 21/74* (2013.01); *G06F 21/32* (2013.01)

(58) Field of Classification Search
CPC .................................. G06F 21/74; G06F 21/32
See application file for complete search history.

(56) References Cited

U.S. PATENT DOCUMENTS

| 6,268,788 B1 * | 7/2001 | Gray ....................... G06F 21/10 235/375 |
| 7,003,676 B1 * | 2/2006 | Weber ...................... G06F 21/74 713/172 |

(Continued)

FOREIGN PATENT DOCUMENTS

| CN | 102330519 A | 1/2012 |
| EP | 2 498 529 A1 | 9/2012 |

(Continued)

OTHER PUBLICATIONS

Chinese Office Action dated Nov. 5, 2018, issued in the Chinese Patent Application No. 201580009529.2.

(Continued)

*Primary Examiner* — Saleh Najjar
*Assistant Examiner* — Devin E Almeida
(74) *Attorney, Agent, or Firm* — Jefferson IP Law, LLP

(57) ABSTRACT

A method and apparatus for processing biometric information in an electronic device including a processor that operates at a normal mode or at a secure mode, the method comprising, detecting a biometric input event from a biometric sensor module at normal mode, creating biometric data based on sensed data from the biometric sensor module at the secure mode, performing biometric registration or biometric authentication based on the created biometric data at the secure mode, and providing result information of biometric registration or biometric authentication at the normal mode.

26 Claims, 8 Drawing Sheets

(51) Int. Cl.
*G06F 21/74* (2013.01)
*G06F 21/32* (2013.01)

(56) References Cited

U.S. PATENT DOCUMENTS

| | | | |
|---|---|---|---|
| 7,065,654 B1* | 6/2006 | Gulick | G06F 21/72 |
| | | | 713/164 |
| 8,726,399 B1* | 5/2014 | Eshun | G06F 21/606 |
| | | | 726/26 |
| 2005/0129291 A1* | 6/2005 | Boshra | G06K 9/00026 |
| | | | 382/124 |
| 2005/0228993 A1* | 10/2005 | Silvester | G06F 21/32 |
| | | | 713/168 |
| 2006/0093191 A1* | 5/2006 | Neil | G06F 1/32 |
| | | | 382/124 |
| 2006/0112279 A1* | 5/2006 | Cohen | G06F 21/121 |
| | | | 713/186 |
| 2007/0162739 A1 | 7/2007 | Lacous | |
| 2007/0177769 A1* | 8/2007 | Motoyama | G06F 21/32 |
| | | | 382/115 |
| 2008/0068381 A1* | 3/2008 | Cohen | H04L 41/048 |
| | | | 345/440 |
| 2008/0196081 A1 | 8/2008 | Hajji et al. | |
| 2009/0058598 A1* | 3/2009 | Sanchez Sanchez | G06F 21/32 |
| | | | 340/5.83 |
| 2009/0067687 A1* | 3/2009 | Boshra | G06F 21/32 |
| | | | 382/124 |
| 2009/0086964 A1* | 4/2009 | Agrawal | G06F 21/10 |
| | | | 380/44 |
| 2009/0315675 A1* | 12/2009 | Yokota | G06F 21/32 |
| | | | 340/5.83 |
| 2009/0327743 A1* | 12/2009 | Finlayson | G06F 21/32 |
| | | | 713/186 |
| 2010/0031320 A1 | 2/2010 | Bhesania et al. | |
| 2010/0192230 A1 | 7/2010 | Steeves et al. | |
| 2011/0123072 A1 | 5/2011 | Moon et al. | |
| 2011/0179284 A1* | 7/2011 | Suzuki | G06F 21/32 |
| | | | 713/186 |
| 2012/0117381 A1* | 5/2012 | Lo | G06F 8/63 |
| | | | 713/156 |
| 2012/0167188 A1* | 6/2012 | Poornachandran | H04W 12/06 |
| | | | 726/7 |
| 2012/0167194 A1* | 6/2012 | Reese | G06F 21/31 |
| | | | 726/9 |
| 2013/0266141 A1 | 10/2013 | Kim et al. | |
| 2014/0032933 A1* | 1/2014 | Smith | G06F 21/31 |
| | | | 713/193 |
| 2014/0181959 A1* | 6/2014 | Li | G06F 21/32 |
| | | | 726/19 |
| 2014/0195815 A1* | 7/2014 | Taveau | G06F 21/32 |
| | | | 713/186 |
| 2014/0282945 A1* | 9/2014 | Smith | H04L 63/0861 |
| | | | 726/6 |
| 2014/0289833 A1* | 9/2014 | Briceno | H04L 63/08 |
| | | | 726/7 |
| 2015/0348022 A1* | 12/2015 | Khan | G06Q 20/385 |
| | | | 705/71 |
| 2016/0127351 A1* | 5/2016 | Smith | G06F 21/316 |
| | | | 726/10 |
| 2016/0241552 A1* | 8/2016 | Lindemann | H04L 63/0861 |
| 2017/0039368 A1* | 2/2017 | Grobman | H04W 12/0027 |
| 2017/0310647 A1* | 10/2017 | Hu | G06F 21/53 |

FOREIGN PATENT DOCUMENTS

| | | |
|---|---|---|
| KR | 10-2004-0001411 A | 1/2004 |
| KR | 10-2007-0036277 A | 4/2007 |
| KR | 10-0797897 B1 | 1/2008 |
| KR | 10-1228362 B1 | 2/2013 |
| KR | 10-1255555 B1 | 4/2013 |
| KR | 10-2013-0126772 A | 11/2013 |
| WO | 2012/167352 A1 | 12/2012 |

OTHER PUBLICATIONS

Korean Office Action dated Mar. 16, 2020, issued in Korean Patent Application No. 10-2014-0019226.

Korean Decision to Grant a Patent dated Aug. 31, 2021, issued in Korean Patent Application No. 10-2021-0003812.

* cited by examiner

METHOD AND APPARATUS FOR PROCESSING BIOMETRIC INFORMATION IN ELECTRONIC DEVICE

CROSS-REFERENCE TO RELATED APPLICATION(S)

This application is a continuation application of prior application Ser. No. 14/619,731, filed on Feb. 11, 2015, which claimed the benefit under 35 U.S.C. § 119(a) of a Korean patent application filed on Feb. 19, 2014 in the Korean Intellectual Property Office and assigned Serial No. 10-2014-0019226, the entire disclosure of which is hereby incorporated by reference.

TECHNICAL FIELD

The present disclosure relates to a method and apparatus for processing biometric information in an electronic device.

BACKGROUND

With the development of hardware and software technology, electronic devices are now able to control and support a variety of functions. For example, an electronic device may be equipped with a biometric function that recognizes an individual's biometrics for use in security or authentication systems. In implementation, a biometric function is performed to authenticate a user by comparing the user's input data with data stored in the authentication system, e.g., by using a personal and/or inherent body characteristic (e.g., fingerprint, face, iris, voice, lines of the palm, vein patterns, etc.).

In recent years, cases have increased that a user's personal information was frequently disclosed from their electronic devices by hacking programs. Therefore, electronic devices need systems that can prevent a user's inherent and/or personal biometric information from being disclosed by hacking with malicious intent, etc. In this regard, studies have been made about security performance and reliability of biometric methods according to security systems, authentication systems or the applications.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for processing and protecting biometric information when performing a biometric function and user authentication by using his/her biometric information.

Another aspect of the present disclosure is to provide an electronic device adapted to the method.

In accordance with an aspect of the present disclosure, a method for processing biometric information in an electronic device including a processor that controls at a normal mode or at a secure is provided, the method including detecting a biometric input event from a biometric sensor module at the normal mode, in response to the biometric input event, creating biometric data based on sensed data from the biometric sensor module at the secure mode, performing biometric registration or biometric authentication based on the created biometric data at the secure mode, providing result information of the biometric registration or the biometric authentication at the normal mode.

In accordance with another aspect of the present disclosure, an electronic device for processing biometric information is provided. The electronic device includes a biometric sensor module configured to sense a biometric object and the processor. The processor is configured to operate at a normal mode or at a secure mode, detect a biometric input event from the biometric sensor module at the normal mode, in response to the biometric input event, create biometric data based on sensed data from the biometric sensor module at the secure mode, perform biometric registration or biometric authentication based on the created biometric data at the secure mode, and provide result information of biometric registration or biometric authentication at the normal mode.

As described above, the biometric information processing method and apparatus according to the various embodiments of the present disclosure can process and manage biometric data at a secure mode, thereby enhancing the level of security of biometric information. The method and apparatus can also transform biometric data by using information obtainable at a secure mode and use the transformed data for biometric authentication, thereby securely protecting personal and/or inherent biometric information against unauthorized use or disclosure although the biometric information is disclosed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
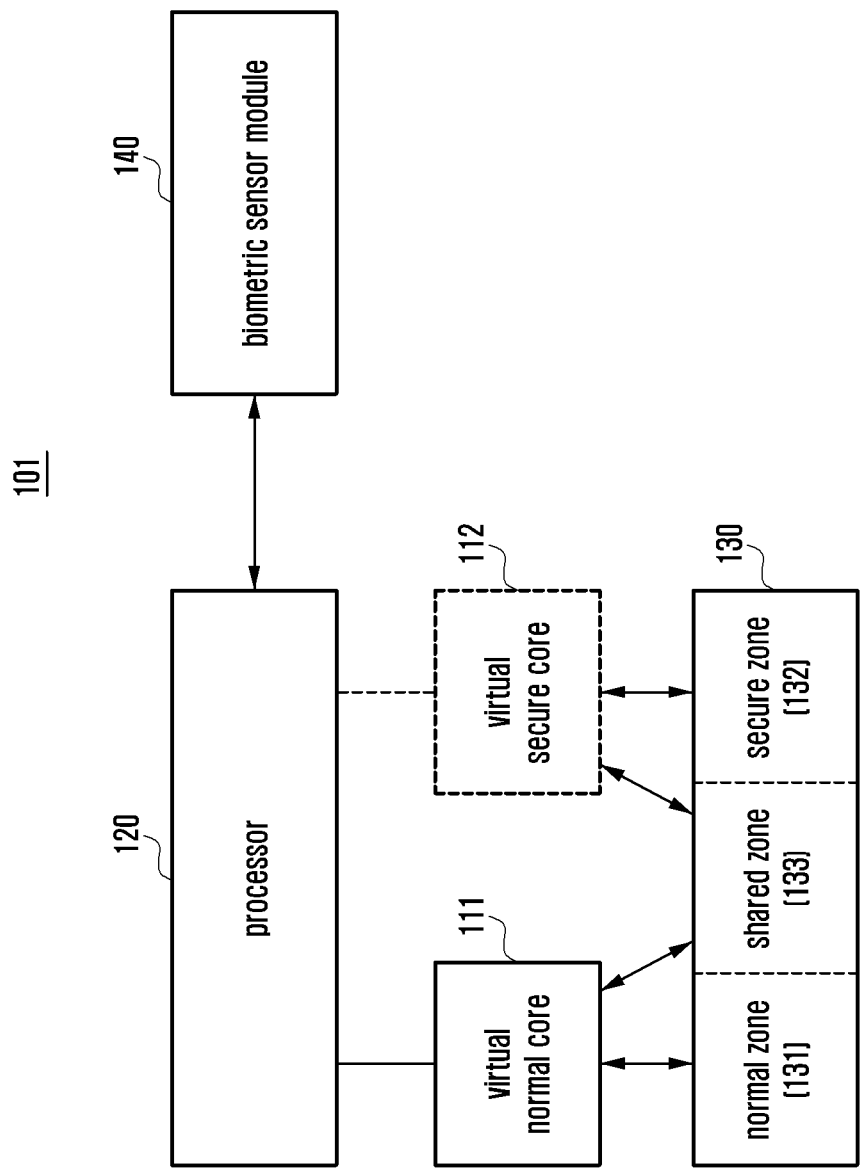
FIG. 1 is a schematic block diagram of a processor of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the expressions "comprises" and "may comprise" are used to specify the presence of a disclosed function, operation, component, etc. but do not preclude the presence of one or more functions, operations, components, etc. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components but not restrict the corresponding components. However, it is obvious that the components should not be defined by these terms. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to limit the disclosure. As used herein, the singular forms are intended to include the plural forms as well, unless the context clearly indicates otherwise.

Unless otherwise defined, all terms used herein have the same meaning as commonly understood by one of ordinary skill in the art to which this disclosure pertains, and should be interpreted neither as having an excessively comprehensive meaning nor as having an excessively contracted meaning. The general terms used herein should be interpreted according to the definitions in the dictionary or in the context and should not be interpreted as an excessively contracted meaning.

In the following description, an "electronic device" may be a device having a communication function. Examples of the electronic device may include at least one of a smartphone, a tablet personal computer (PC), a mobile phone, a video phone, an electronic book (ebook) reader, a desktop PC, a laptop PC, a netbook PC, a Personal Digital Assistant (PDA), a Portable Multimedia Player (PMP), an MP3 player, a mobile medical appliance, a camera, a wearable device (e.g. head-mounted-device (HMD) such as electronic glasses), electronic clothing, an electronic bracelet, an electronic neckless, an appcessory, an electronic tattoo, and a smart watch.

According to various embodiments, examples of the electronic device may be a smart home appliance having a communication function. Examples of the smart home appliance may include at least one of a television, a Digital Video Disk (DVD) player, an audio player, a refrigerator, an air conditioner, a cleaner, an oven, a microwave oven, a laundry machine, an air cleaner, a set-top box, a TV box (e.g. Samsung HomeSync™, Apple TV™, and Google TV™), a game console, an electronic dictionary, an electronic key, a camcorder, and an electronic frame.

According to various embodiments, examples of the electronic device may include at least one of a medical appliance (e.g. Magnetic Resonance Angiography (MRA), Magnetic Resonance Imaging (MRI), Computed Tomography (CT), camera, and ultrasonic device), a navigation device, a Global Positioning System (GPS) receiver, an Event Data Recorder (EDR), a Flight Data Recorder (FDR), a car infotainment device, an electronic equipment for a ship (e.g. marine navigation device and gyro compass), an avionics device, a security device, a Head Up Display (HUD), an industrial or home robot, an Automatic Teller Machine (ATM) of a financial institution, and a Point Of Sales (POS).

According to various embodiments, examples of the electronic device may include furniture or a part of a building/construction which has a communication function, an electronic board, an electronic signature receiving device, a projector, and a metering device (e.g. water, electricity, and electric wave metering devices). According to an embodiment, the electronic device may be one or any combination of the above enumerated devices. According to an embodiment, the electronic device may be a flexible device. However, it is obvious to those in the art that the electronic device of the present disclosure is not limited to the above devices.

A description is made of an electronic device according to various embodiments with reference to accompanying drawings hereinafter. In the description of the various embodiments, the term 'user' may denote a person or a device (e.g., an intelligent electronic device) which uses the electronic device.

FIG. 1 is a schematic block diagram of a processor of an electronic device according to various embodiments of the present disclosure.

Referring to FIG. 1, the electronic device 101 may operate at a normal mode or at a secure mode. The electronic device 101 may include a processor 120 that operates by dividing one core into two virtual cores. For example, the processor 120 may operate a normal OS (operating system) using a virtual normal core 111 at a normal mode (e.g., Rich Execution Environment, normal world etc.) and operate a virtual OS using a virtual secure core 112 at a secure mode (e.g., Trusted Execution Environment, secure world, etc.).

The processor 120 may call the normal OS or the virtual OS through a kernel driver (not shown). The processor 120 may switch between the normal mode that operates at the normal OS and the secure mode that operates at the virtual OS.

The electronic device 101 may include a memory 130 having a normal zone 131, a secure zone 132, and a shared zone 133. The normal zone 131 may store data and task instructions related to the virtual normal core 111. The normal zone 131 may include software programs or program modules (e.g., a biometric application, a biometric recognition control module, etc.) operated by using the virtual normal core 111. For example, the processor 120 operated by using the virtual normal core 111 may control the software programs or the program modules of the normal zone 131 without access limitation.

In the memory 130 of the electronic device 101, the secure zone 132 may store data and task instructions related to the virtual secure core 112. The secure zone 132 may include software programs or program modules (e.g., a biometric processing module, a channel control module, etc.) operated by using the virtual secure core 112. For example, the processor 120 operated by using the virtual secure core 112 may control the software programs or the program modules of the secure zone 132 with access limitation. The secure zone 132 may be accessed by signals with security access, authorization, and/or reliability.

The normal zone 131 and secure zone 132 may be part of the memory 130. The shared zone 133 that stores data and instructions for allowing the virtual normal core 111 and the virtual secure core 112 to mutually access each other when the virtual normal core 111 or the virtual secure core 112 operates. The shared zone 133 may manage address space for an operating system stored in the memory 130 and include memory management information for allocation of resources. The shared zone 133 may store information to call the normal OS or the secure OS.

A biometric sensor module 140 of the electronic device 101 may sense objects for recognizing biometrics. The objects may be a user's body and/or at least part of the body. The objects may be an individual's inherent and/or personal object(s) that can be physically or physiologically classified, such as a fingerprint, an iris, a retina pattern, a vein pattern, an ear shape, a facial outline, a voice, a palm shape, a user's writing (e.g., signature), etc.

The biometric sensor module 140 may include sensors operating in various types of biometric recognizing modes. For example, the biometric sensor module 140 may include a fingerprint sensor, a retina sensor, an iris sensor, a vein pattern sensor, etc. The biometric sensor module 140 may also include a camera and an optical sensor such as an infrared sensor, etc. for recognizing a face, an iris, etc., a tactile sensor or a touch panel, etc. for detecting a user's handwriting, etc. In various embodiments of the present disclosure, the biometric sensor module 140 may receive sensed data from the outside of the electronic device 101 or a separate external system.

In the following description, the components of the electronic device 101 according to various embodiments of the present disclosure will be described in more detail referring to FIGS. 2 and 3.

Figure 2:
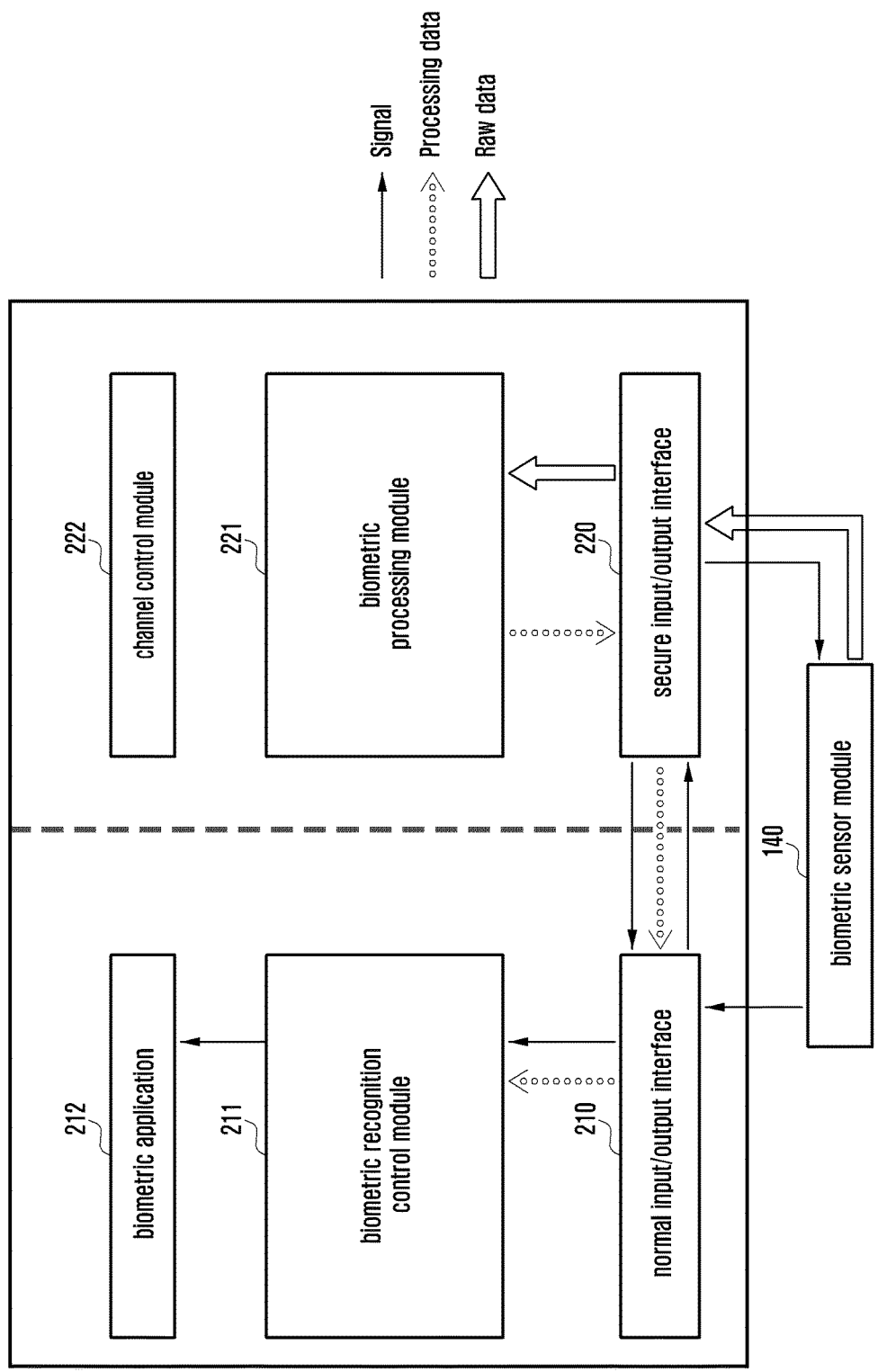
FIG. 2 is a schematic block diagram of an electronic device according to various embodiments of the present disclosure.

FIG. 2 is a schematic block diagram of an electronic device according to various embodiments of the present disclosure.

Referring to FIG. 2, the electronic device (e.g., the electronic device 101 of FIG. 1) may that operates at the normal mode or at the secure mode.

The electronic device may mutually switch between the normal mode and the secure mode. The electronic device performs tasks at the normal mode by using resources allocated to the virtual normal core. The electronic device performs tasks at the secure mode by using resources allocated to the virtual secure core.

At the normal mode, the electronic device may operate by the normal OS and perform the following operations. The electronic device may control functions of a normal input/output interface 210, a biometric recognition control module 211, and a biometric application 212, and may process data. For example, the electronic device at the normal mode may detect whether a biometric input event (signal) occurs and request (or notify) for operating by the secure mode in response to the biometric input event. For example, the electronic device may occur an interrupt signal for the secure mode and transfer an interrupt signal through a kernel driver from the normal OS to the secure OS, and may call a virtual secure core. The electronic device may change a current mode to the secure mode. At the normal mode, the electronic device may perform an operation to provide result information of biometric processing to a user interface.

At the secure mode, the electronic device may operate by the secure OS and perform the following operations. The electronic device may control functions of a secure input/output interface 220, a biometric processing module 221 and a channel control module 222, and may process data. For example, at the secure mode, the electronic device may obtain sensed data from the biometric sensor module 140 according to an interrupt signal. The electronic device may create biometric data based on the sensed data, and register the biometric data, or may compare the created biometric data with the previously registered biometric data for biometric authentication. The electronic device may transfer the result of biometric processing using a kernel driver (not shown), from the secure OS to the normal OS. Then, the electronic device may call a virtual normal core and change the secure mode to the normal mode. The result of the biometric processing may be a true-false-type of information (signal). It should be, however, understood that the present disclosure is not limited to the type of information (signal).

In various embodiments of the present disclosure, when the electronic device is operated by the normal OS, the biometric sensor module 140 may sense objects to be recognized. When the biometric sensor module 140 detects objects to be recognized, it may transfer an interrupt signal for notifying the sensing of objects to the normal input/output interface 210.

At the normal mode, the electronic device may switch from the normal OS to secure OS in response to the interrupt signal. For example, the interrupt signal may be a secure interrupt signal, such as a signal with a secure access or authorization, etc.

At the secure mode, the electronic device may obtain sensed data from the biometric sensor module 140 through the secure input/output interface 220. The sensed data may be raw data that is acquired by the biometric sensor module 140, without being subjected to processing.

At the secure mode, the electronic device may transfer the sensed data to the biometric processing module 221 through the secure input/output interface 220. The biometric processing module 221 for a biometric registration may create biometric data based on the sensed data, and register the biometric data as a registration data. The biometric processing module 221 for a biometric authentication may also perform biometric authentication. For example, the biometric processing module 221 may calculate characteristics of a recognized object from the sensed data. The biometric processing module 221 may convert the characteristics to a form of a template to create biometric data and may store the created biometric data. The biometric processing module 221 may compare registration data, stored in the memory, with biometric data, input to be used for authentication, and determine an authentication result. The biometric processing module 221 may transfer the result of the biometric registration result or the biometric authentication to the secure input/output interface 220.

In various embodiments of the present disclosure, the biometric processing module 221 may create a unique key based on a unique device identifier (e.g., the chipset's unique identifier, etc.), and may encrypt or decrypt biometric data by using the unique key.

In various embodiments of the present disclosure, the biometric processing module 221 may create pseudo-data by using a one way function, a change of data array, etc., and may perform biometric authentication by using the pseudo-data. In that case, the biometric data based on the sensed data may be encrypted and stored in the secure zone, and the pseudo-data may be stored in the normal zone.

In various embodiments of the present disclosure, the channel control module 222 may perform connection control to be mutually compatible with the normal OS or virtual OS, and may also establish secure channels for other electronic devices (e.g., servers, etc.). The channel control module 222 may perform connection control to be mutually compatible with various secure executing environments (e.g., secure OS) operating in the secure mode. The channel control module 222 may configure biometric information, extracted for various uses of biometric information, such as payment, login, etc., to a single biometric message (e.g., an information message), and may establish a secure channel for transmitting the message to another electronic device (e.g., a server, etc.). The channel control module 222 may establish secure channels with another electronic device, encrypted by a key created based on the pre-set unique device identifier.

At the secure mode, the electronic device may transfer (or notify) a result information (e.g., result signal) of the biometric registration or the biometric authentication to the normal input/output interface 210 though the secure input/output interface 220. The electronic device may switch the current mode to the normal mode, in response to the result.

At the normal mode, the electronic device may receive the result information through the normal input/output interface 210 and may transfer it to the biometric recognition control module 211.

The biometric recognition control module 211 may provide the result information of the biometric registration or the biometric authentication to the user through the biometric application 212. The biometric recognition control module 211 may control the biometric application 212 to perform the functions according to the result information.

In various embodiments of the present disclosure, when the biometric recognition control module 211 ascertains that biometric authentication is successful, it may operate a preset application or perform a preset function, in response to the authentication success event. For example, when biometric authentication is successful, the biometric recognition control module 211 may unlock the screen lock state or may allow for access to an application requiring user authentication.

The biometric application 212 may accompany a biometric authentication. The biometric authentication may be programmed so that the application can perform biometric authentication. The biometric authentication may be supported by separated applications for supporting biometric authentication, OSs, platforms, or functions for controlling/managing electronic devices.

Figure 3:
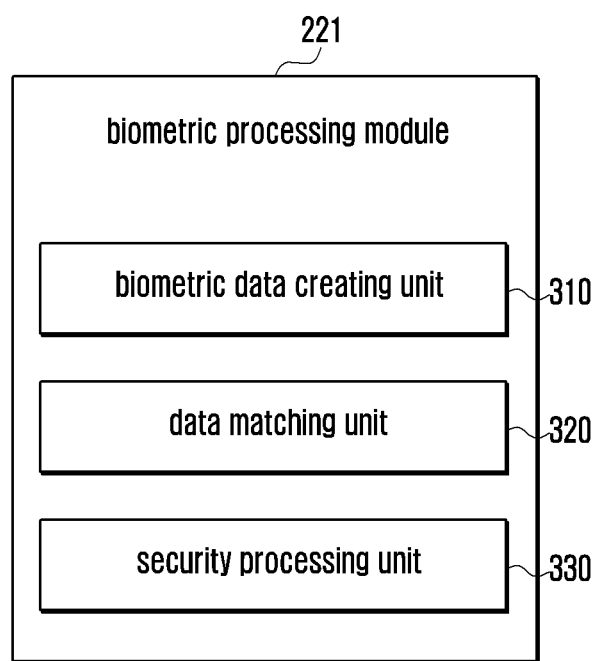
FIG. 3 is a schematic block diagram of a biometric information processing module according to various embodiments of the present disclosure.

FIG. 3 is a schematic block diagram of a biometric processing module according to various embodiments of the present disclosure.

Referring to FIG. 3, the biometric processing module 221 may include a biometric data creating unit 310, a data matching unit 320, and a security processing unit 330.

The biometric data creating unit 310 may calculate an inherent characteristic about a recognized object, based on data sensed by a biometric sensor module (e.g., the biometric sensor module 140 shown in FIG. 2). The biometric data creating unit 310 may transform the calculated inherent characteristic to a biometric template and create the biometric data. The template is created by encoding biometric image information sensed by the sensor. In an embodiment of the present disclosure, the biometric data creating unit 310 may obtain a biometric image (e.g., a fingerprint image, an iris pattern image, a face image, etc.) from the sensed data. For example, the biometric image may be obtained in an optical manner using the principle of light reflection or in a non-optical manner by using pressure, heat, an ultrasonic wave, etc. The biometric data creating unit 310 may extract an individual's inherent and/or personal characteristic, based on biometric images. For example, when authentication of a fingerprint is made, the characteristics for fingerprint authentication may be minutiae, such as a ridge end, a bifurcation point, a core point, a delta point, etc. In order to evaluate how much the sensed data matches the stored biometric registration data, the biometric data creating unit 310 may extract the characteristics in a preset format (or frame). For example, the preset format of characteristics may be a form of a template.

When detecting a request for biometric registration, the biometric data creating unit 310 may store the created biometric data as registration data in the memory.

When detecting a biometric authentication request, the data matching unit 320 may determine whether the biometric data created input form the biometric sensor module matches stored registration data.

In various embodiments of the present disclosure, the data matching unit 320 may compare the characteristic value calculated from the biometric data, created for biometric authentication, with at least one of the values of registration data, and calculate matching values. The matching values may show information about how much the biometric data matches the registration data.

For example, a matching value may be the number of characteristic points matching between the biometric data and the registration data during the matching process. A matching value may be calculated using statistics or a probability function, considering the distance and direction between characteristic points included in the biometric data, the similarity in the arrangement of characteristic points, and/or the like.

The data matching unit 320 may determine whether biometric authentication is successful based on the matching value of the characteristic information. When the data matching unit 320 ascertains that the matching value exceeds a threshold, it concludes that the biometric authentication is successful. On the contrary, when the data matching unit 320 ascertains that the matching value is less than or equal to a threshold, it concludes that the biometric authentication fails.

The data matching unit 320 may transfer the result of authentication (e.g., true-false-type of signal) to a biometric recognition control module (e.g., 211 in FIG. 2) that operating at the normal mode.

The security processing unit 330 may encrypt or decrypt biometric data. The security processing unit 330 may create a unique key based on a unique device identifier. For example, the unique key may be a value accessible at a secure mode.

In an embodiment of the present disclosure, when performing the biometric registration, the security processing unit 330 may encrypt biometric data by using a unique key and store the encrypted biometric data as the registration data in the secure zone of the memory. When performing biometric authentication, the security processing unit 330 may obtain the encrypted registration data from the secure zone, and decrypt it by using a unique key. The security processing unit 330 may transfer the decrypted registration data to the data matching unit. In that case, a function to create a unique key may be a value created when the processor is operated as a secure OS, and the access of unique key is limited when the process is operated as a normal OS.

In an embodiment of the present disclosure, the security processing unit 330 may encrypt biometric data by using a unique key, and may transfer the encrypted biometric data to the biometric recognition control module (e.g., the module 211 shown in FIG. 2) of the normal mode. When performing biometric authentication, the security processing unit 330 may receive the encrypted biometric data from the biometric recognition control module of the normal mode and may decrypt it by using the unique key created through the secure OS. The security processing unit 330 may transfer the decrypted biometric data to the data matching unit.

In an embodiment of the present disclosure, the security processing unit 330 may transform biometric data to pseudo-data using a transformation function. The transformation function may include a one way function, a data array function, etc. The transformation function may use a function that uses a value obtainable from a separate secure hardware device or when it operates at a secure mode. The transformation function may store biometric data as meta-data.

The security processing unit 330 may transfer the created pseudo-data to the data matching unit 320 and the biometric data creating unit 310. For example, the security processing unit 330 may store the pseudo-data as registration data. The biometric data creating unit 310 may determine whether biometric authentication is successful by comparing the registered pseudo-data with newly created pseudo-data.

The security processing unit 330 may variably manage a transformation function for creating pseudo-data. For example, when biometric data is unintentionally disclosed, the security processing unit 330 may change the transformation function and create pseudo-data by the changed transformation function. When biometric data is disclosed, since the meta-data of the biometric data is updated, the security processing unit 330 may update or discard the existing biometric data.

Figure 4:
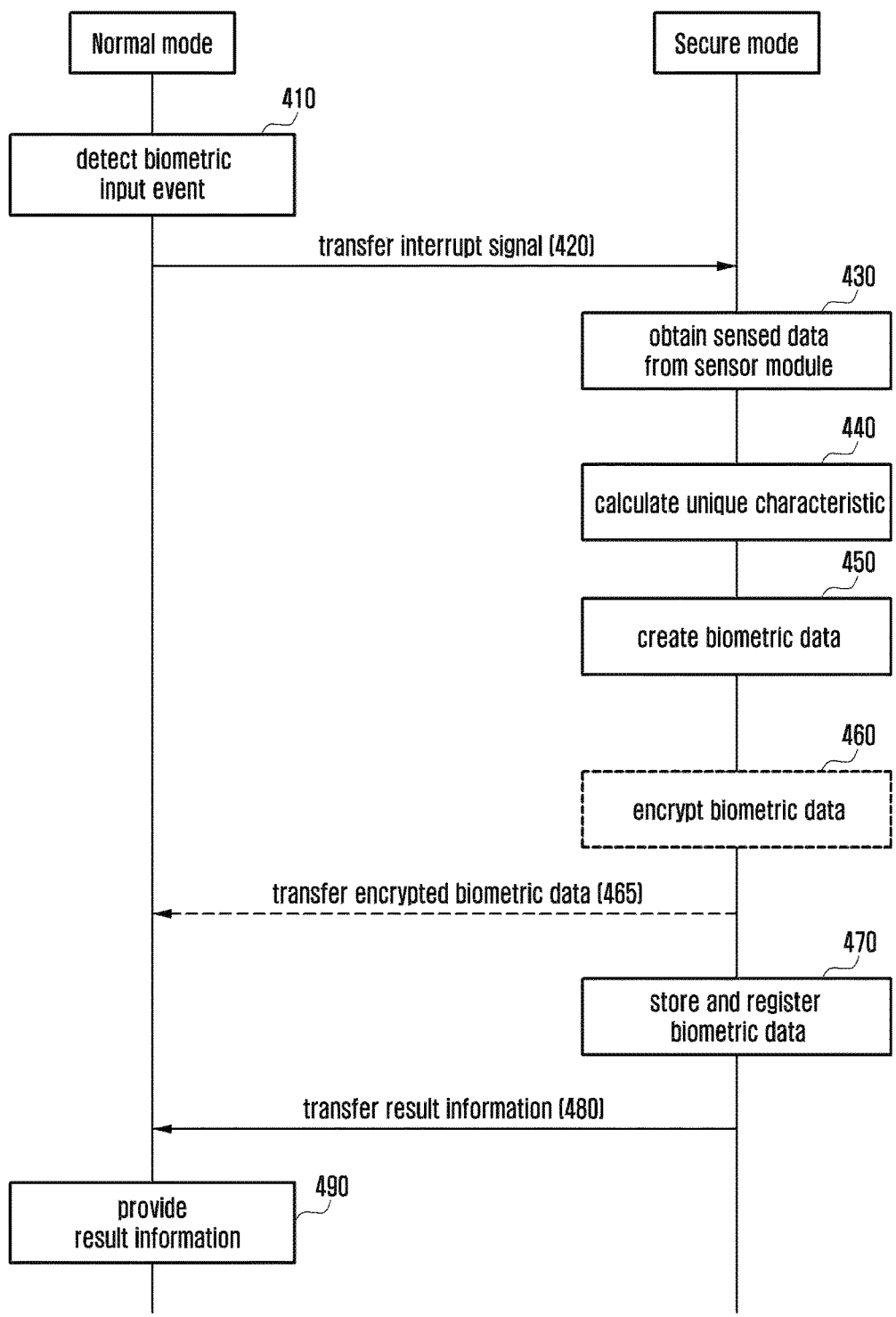
FIG. 4 is a flowchart that describes a method for registering biometric information in an electronic device according to various embodiments of the present disclosure.

FIG. 4 is a flowchart that describes a method for registering biometric information in an electronic device according to various embodiments of the present disclosure.

Referring to FIG. 4, an electronic device may detect a biometric information input event based on an interrupt signal transferred from a biometric sensor module at the normal mode, in order to perform biometric registration (e.g., registration mode) at operation 410. When a request for registering biometric is made at the normal mode, the electronic device activates the biometric sensor module to detect an object to be recognized. For example, the electronic device may recognize a user's finger contacting a fingerprint sensor. The electronic device may recognize a user's eye approaching an iris sensor. The electronic device may recognize a user's hand approaching a vein sensor. The electronic device may recognize a user's voice inputting to a voice sensor. The electronic device may recognize a user's face approaching a facial sensor.

After detecting the biometric input event at operation 410, the electronic device may transfer an event signal to a secure OS to call a virtual secure core at operation 420. The event signal may be a secure interrupt signal. The electronic device may switch form the normal mode to the secure mode.

At the secure mode, the electronic device may obtain sensed data through the biometric sensor module at operation 430. The sensed data may be raw data of the biometric information. For example, the sensed data may include at least one of fingerprints, lines of a palm, a retina pattern, an iris pattern, a vein pattern, an ear shape, a facial outline, a voice, a user's writings (e.g., signature), etc.

At the secure mode, the electronic device may extract a unique characteristic of a recognized object based on the sensed data at operation 440. For example, the electronic device may extract a sensed image from sensed data and may calculate a characteristic from the sensed image.

At the secure mode, the electronic device may transform the characteristics to a template form and may create biometric data at operation 450.

At the secure mode, the electronic device may encrypt the biometric data at operation 460. For example, the electronic device may create a unique key based on a unique device identifier in the secure mode. The unique key may be a value accessible in secure mode. For example, in the secure mode, the electronic device may store function information for creating a unique key in a secure zone on a memory, and may create a unique key using the function information The embodiment of the present disclosure may be modified without operation 460, however, it should be understood that the present disclosure is not limited to the modification and the embodiment.

At the secure mode, the electronic device may transfer the encrypted biometric data from the secure OS to the normal OS at operation 465. For example, the electronic device may store the encrypted biometric data in a memory (e.g., a REE file system) allocated as a normal zone.

At the secure mode, the electronic device may store or register the biometric data or the encrypted biometric data as registration data for biometric authentication at operation 470.

In an embodiment of the present disclosure, the electronic device may store or register biometric data in a secure zone of the memory accessible at secure mode.

In an embodiment of the present disclosure, the electronic device may store a unique key used for encryption or function information for creating a unique key in a secure zone accessible in secure mode, and may transfer the encrypted biometric data to the normal OS. The electronic device may store or register the encrypted biometric data, transferred from the secure OS, in the normal zone without access limitation.

The electronic device may transfer result information related to biometric registration from the secure OS to the normal OS at operation 480. At the normal mode, the electronic device may provide result information, indicating that biometric registration, to the user through the user interface or the component of the electronic device at operation 490.

Meanwhile, when registration of biometric data has failed because of the deterioration of the quality of raw data, etc., the processor may perform a registration procedure again. To this end, at the normal mode, the electronic device may provide a feedback about registration failure (e.g., a visual effect, an audio effect, etc.) and/or an acquisition of new sensed data to the user interface.

Figure 5:
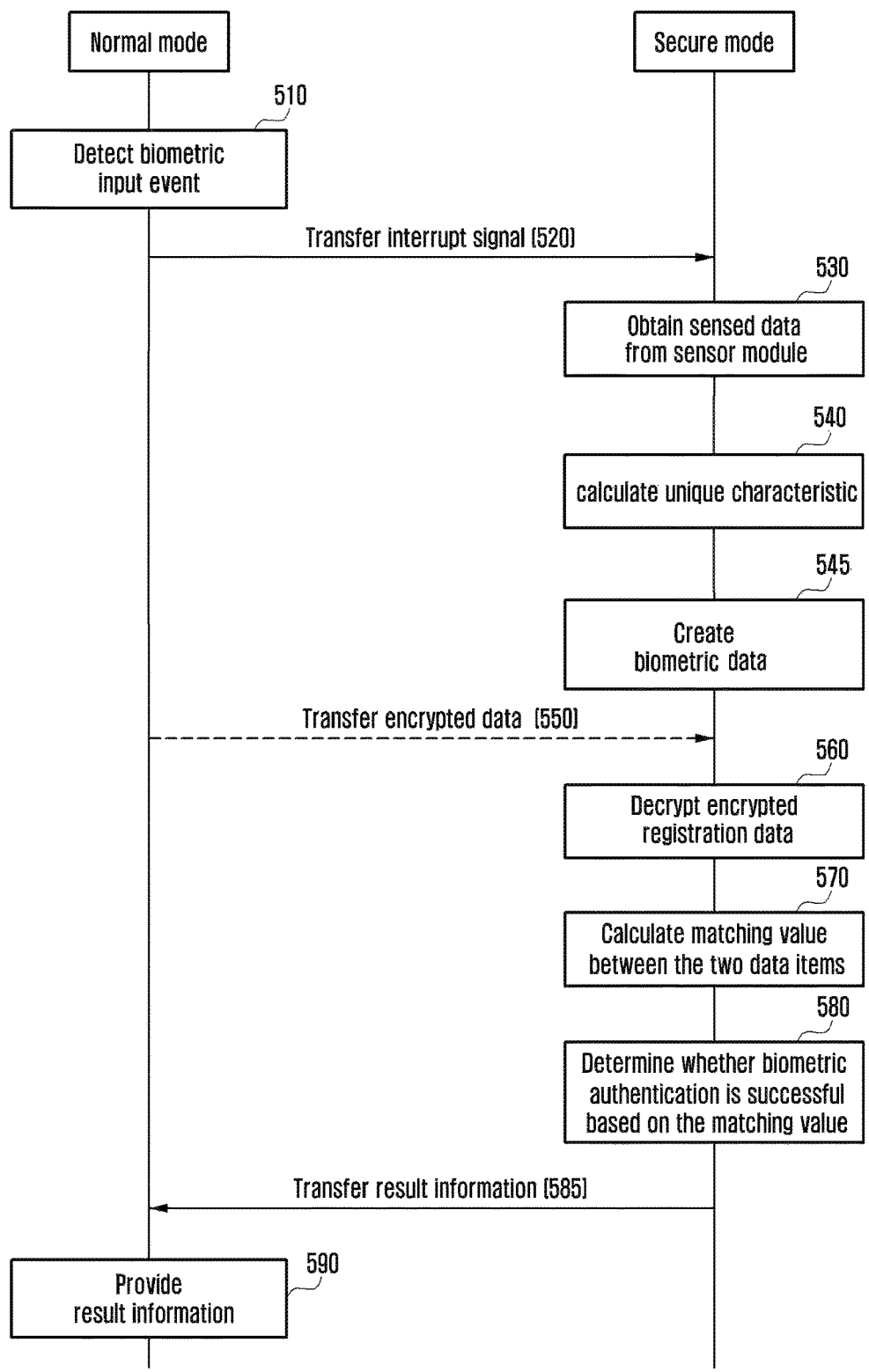
FIG. 5 is a flowchart that describes a method for authenticating biometric information in an electronic device according to various embodiments of the present disclosure.

FIG. 5 is a flowchart that describes a method for authenticating biometric information in an electronic device according to various embodiments of the present disclosure.

Referring to FIG. 5, at a normal mode, an electronic device may detect a biometric input event based on an interrupt signal transferred from a biometric sensor module, in order to perform biometric authentication (e.g., authentication mode) at operation 510. When a request for performing biometric authentication is made in the normal mode, the electronic device activates the biometric sensor module to detect a recognized object.

After detecting the biometric input event at operation 510, the electronic device may transfer an event signal to the secure OS at operation 520. The event signal may be a secure interrupt signal. The electronic device may call a secure OS and switch form the normal mode to a secure mode, biometric in At the secure mode, the electronic device may obtain sensed data through the biometric sensor module at operation 530. At the secure mode, the electronic device may extract a unique characteristic of a recognized object based on the sensed data at operation 540. The electronic device may create biometric data for biometric authentication at operation 545. The biometric data may be a preset format, e.g., a form of a template.

Meanwhile, at the secure mode, the electronic device may receive encrypted registration data stored the normal zone or may obtain encrypted registration data from a memory allocated as a secure zone at operation 550.

At the secure mode, the electronic device may decrypt the registration data (e.g., encrypted registration data) at operation 560. For example, at the secure mode, if obtaining encrypted registration data, the electronic device may decrypt the encrypted registration data by using a unique key. The processor may obtain function information for creating a unique key from a memory allocated as a secure zone with access limitation, and may create the unique key by using the obtained function information.

At the secure mode, the electronic device may calculate a matching value by comparing one or more characteristics, calculated from biometric data, and registration data at operation 570.

At the secure mode, the electronic device may determine whether biometric authentication is successful based on the matching value of the one or more characteristics at operation 580. For example, when the matching value exceeds a preset threshold, the electronic device concludes that biometric authentication is successful. On the contrary, when the matching value is less than or equal to the preset threshold, the electronic device concludes that biometric authentication has failed.

The electronic device may transfer result information of the biometric authentication from the secure OS to the normal OS at operation 585. The electronic device may call a normal OS and switch form the secure mode to the normal mode. In the normal mode, the electronic device may provide the result information of the biometric authentication to the user via the user interface or the component of the electronic device at operation 590.

Meanwhile, when the biometric authentication has failed because of the deterioration of the quality of raw data, etc., the electronic device may perform an authentication procedure again. To this end, at the normal mode, the electronic device may provide feedback about an authentication failure (e.g., a visual effect, an audio effect, a tactile effect, an olfactory effect, etc.) and/or an acquisition of new sensed data to the user interface.

Figure 6:
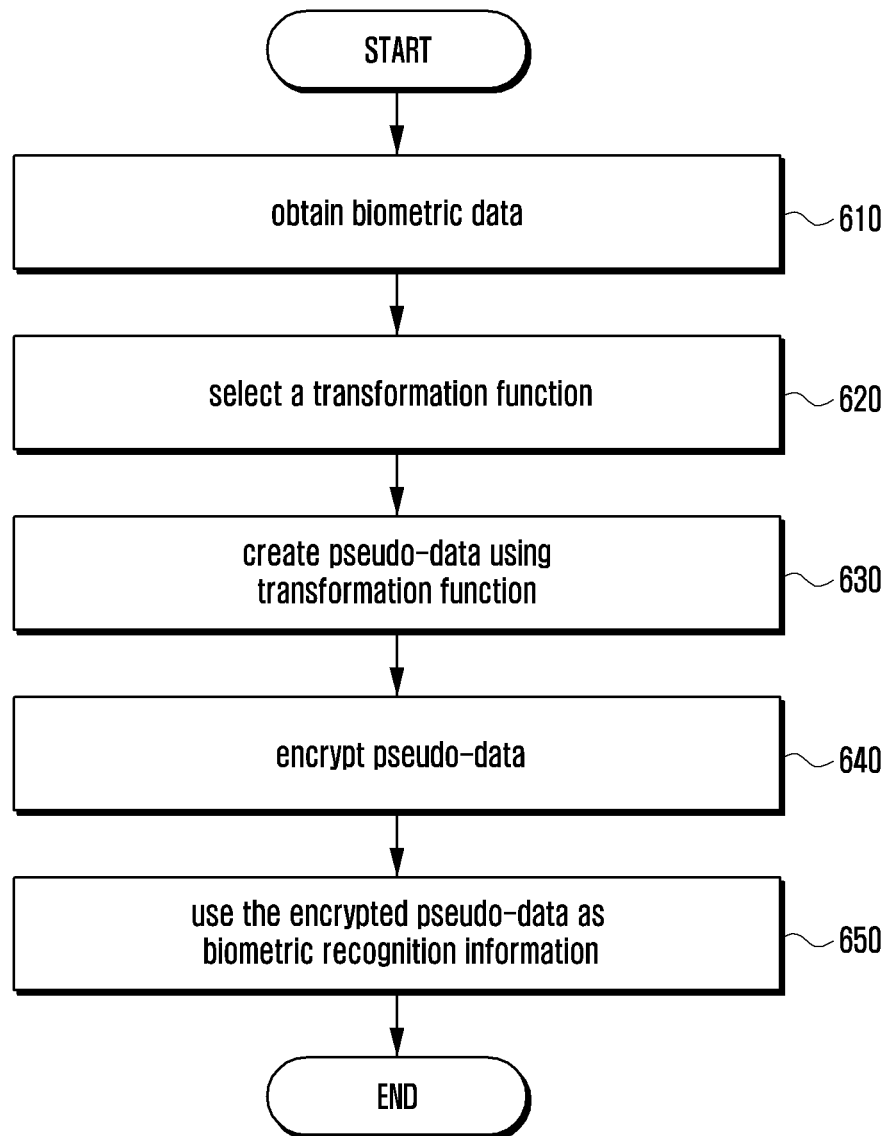
FIG. 6 is a flowchart that describes a method for processing biometric information in an electronic device according to various embodiments of the present disclosure.

FIG. 6 is a flowchart that describes a method for processing biometric information in an electronic device according to various embodiments of the present disclosure.

Referring to FIG. 6, the electronic device may obtain biometric data at a secure mode at operation 610. The electronic device may select a transformation function at the secure mode at operation 620. The electronic device may create pseudo-data using the transformation function at operation 630. The pseudo-data may be transformed to a preset format, e.g., a form of a template.

The transformation function may include a one way function, a data array function, etc. The transformation function may use a function that uses a value obtainable in a separate secure hardware device or when it operates at the secure mode.

In various embodiments of the present disclosure, the electronic device may re-transform pseudo-data created by using additional information of biometric data at the secure mode The additional information may include information created when biometric data is created, the score of matching between biometric data, the number of attempts, information about the finger if the biometric data is a fingerprint, preset information when the user registers his/her biometric data, etc. The transformation function and additional information may be stored as meta-data of the biometric data. The meta-data of the biometric data may be stored in a memory allocated as a zone accessible in a secure mode.

The electronic device may encrypt pseudo-data transformed in the secure mode at operation 640. For example, the electronic device may create a unique key based on a unique device identifier at the secure mode.

The electronic device may use the transformed data or encrypted transformed data as registration data for biometric recognition or biometric authentication at the secure mode at operation 650.

In an embodiment of the present disclosure, the electronic device may store pseudo-data as registration data. The electronic device may store pseudo-data in the normal zone. The electronic device may control the biometric application function based on the pseudo-data at the normal mode.

In an embodiment of the present disclosure, when biometric data has been registered as pseudo-data (e.g., registered pseudo-data), the electronic device may transform biometric data, newly input for performing biometric authentication, to pseudo-data at the secure mode by using a transformation function. After that, the electronic device may determine whether biometric authentication is successful by comparing the transformed pseudo-data with registered pseudo-data.

In an embodiment of the present disclosure, when biometric information is disclosed, the electronic device may change the transformation function and may update metadata of the biometric data by using the changed transformation function.

Figure 7:
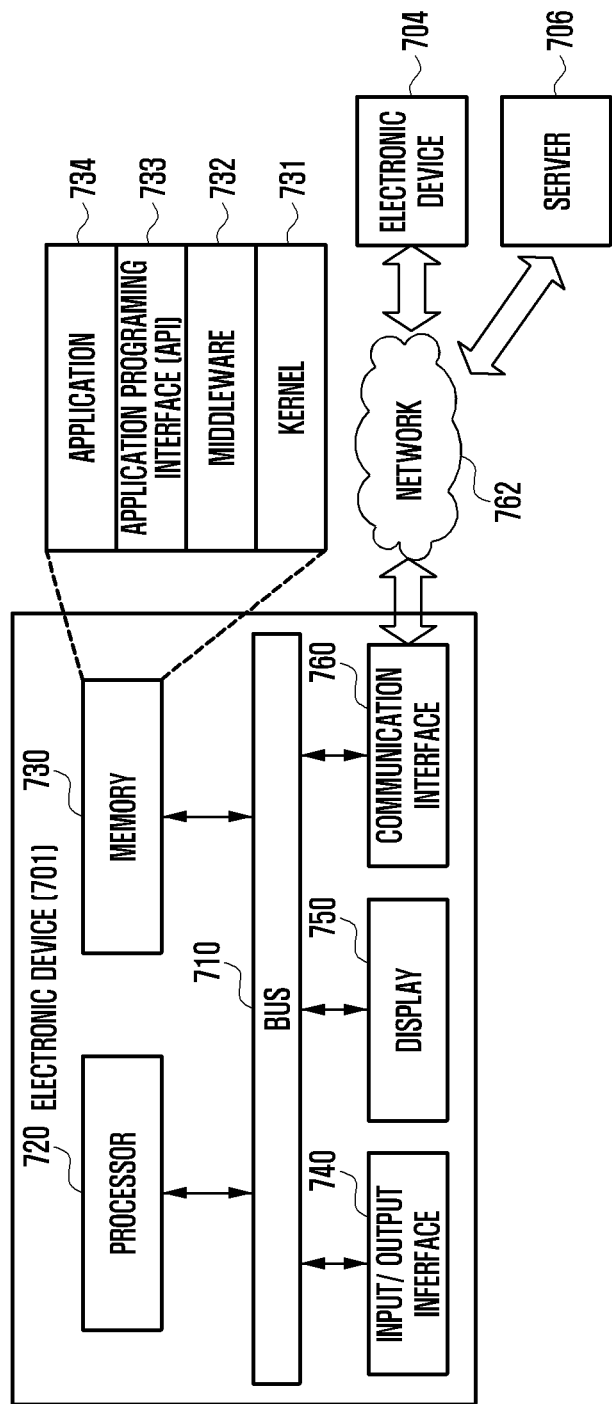
FIG. 7 illustrates a network environment including electronic devices according to various embodiments of the present disclosure.

FIG. 7 is a diagram illustrating a network architecture including an electronic device according to various embodiments of the present disclosure.

Referring to FIG. 7, the electronic device 701 includes a bus 710, a processor 720, a memory 730, an input/output interface 740, a display 750, and a communication interface 760.

The bus 710 may be circuitry which connects the aforementioned components to each other to communicate signals (e.g., control messages) therebetween.

The processor 720 receives a command from any of the aforementioned components (e.g., the memory 730, the input/output interface 740, the display 750, and the communication interface 760) through the bus 710, interprets the command, and executes an operation or data processing according to the decrypted command.

The memory 730 may store the command or data received from the processor 720 or another component (e.g., the input/output interface 740, the display 750, the communication interface 760, etc.) or generated by the processor 720 or another component. The memory 730 may store program modules including a kernel 731, middleware 732, an Application Programming Interface (API) 733, one or more applications 734, etc. Each programing module may be implemented as software, firmware, hardware, and any combination thereof.

The kernel 731 may control or manage the system resources (e.g., the bus 710, the processor 720, the memory 730, etc.) for use in executing the operation or function implemented with the middleware 732, the API 733, or the application(s) 734. The kernel 731 also may provide an interface allowing the middleware 732, the API 733, or the application(s) 734 to access the components of the electronic device 701 to control or manage.

The middleware 732 may work as a relay of data communicated between the API 733 or the application(s) 734 and the kernel 731. The middleware 732 may execute control of the task requests from the application(s) 734 in such a way of assigning priority for use of the system resource (e.g., bus 710, processor 720, and memory 730) of the electronic device to at least one of the application(s) 734.

The API 733 is the interface for the application(s) 734 to control the function provided by the kernel 731 or the middleware 732 and may include at least one interface or function (e.g., command) for file control, window control, image control, or text control.

According to various embodiments, the application(s) 734 may include a Short Messaging Service/Multimedia Messaging Service (SMS/MMS) application, an email application, a calendar application, an alarm application, a health care application (e.g., application of measuring quantity of motion or blood sugar level), and an environmental information application (e.g., atmospheric pressure, humidity, and temperature applications). Additionally or alternatively, the application(s) 734 may be related to information exchange between the electronic device 701 and another external electronic device (e.g., an electronic device 704). Examples of the information exchange application may include a notification relay application for relaying specific information to the external electronic device 704 and a device management application for managing the external electronic device.

For example, the notification relay application may be provided with a function of relaying the alarm information generated by the other applications (e.g., SMS/MMS application, the email application, the health care application, and the environmental information application) of the electronic device to an external electronic device (e.g., the electronic device 704). Additionally or alternatively, the notification relay application may provide the user with the notification information received from an external electronic device (e.g., the electronic device 704). The electronic device application may manage (e.g., install, delete, update, etc.) the function of an external electronic device (e.g., turn-on/off of the electronic device 704 itself (or a part of it) or adjustment of the brightness (or resolution) of the display) which communicates with the electronic device 701 or the service (e.g., communication or messaging service) provided by the external electronic device or an application running on the external device.

According to various embodiments, the application(s) 734 may include an application designated according to the property (e.g., type) of an external electronic device (e.g., the electronic device 704). If the external electronic device is an MP3 player, the application(s) 734 may include a music playback application. Similarly, if the external electronic device is a mobile medical appliance, the application(s) 734 may include a health care application. According to an embodiment, the application(s) 734 may include at least one of applications designated to the electronic device 701 or the applications received from the external electronic device (e.g., a server 706 and the electronic device 704).

The input/output interface 740 delivers a command or data input by a user through an input/output device (e.g., a sensor, a keyboard, a touchscreen, etc.) to the processor 720, the memory 730, and/or the communication interface 760, through the bus 710. For example, the input/output interface 740 may provide the processor 720 with the data corresponding to a touch made by the user on the touchscreen. The input/output interface 740 may output the command or data (which is received from the processor 720, the memory 730, or the communication interfaced 760, through the bus 710) through the input/output device (e.g., a speaker, a display, etc.). For example, the input/out interface 740 may output the voice data processed by the processor 720 to the user through the speaker.

The display 750 may present various information (e.g., multimedia data, text data, etc.) to the user.

The communication interface 760 may establish a communication connection of the electronic device 701 with an external device (e.g., the electronic device 704, the server 706, etc.). For example, the communication interface 760 may connect to a network 762 through a wireless or wired link for communication with the external device. Examples of the wireless communication technology may include Wi-Fi, Bluetooth (BT), Near Field Communication (NFC), GPS, and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment of the present disclosure, the network 762 may be a telecommunication network. The communication network may include at least one of a computer network, the Internet, an Internet of Things, and a telephone network. According to an embodiment of the present disclosure, the communication protocol between the electronic device 701 and an external device (e.g., a transport layer protocol, a data link layer protocol, a physical layer protocol, etc.) may be supported by at least one of the applications 734, the API 733, the middleware 732, the kernel 731, and the communication interface 760.

Figure 8:
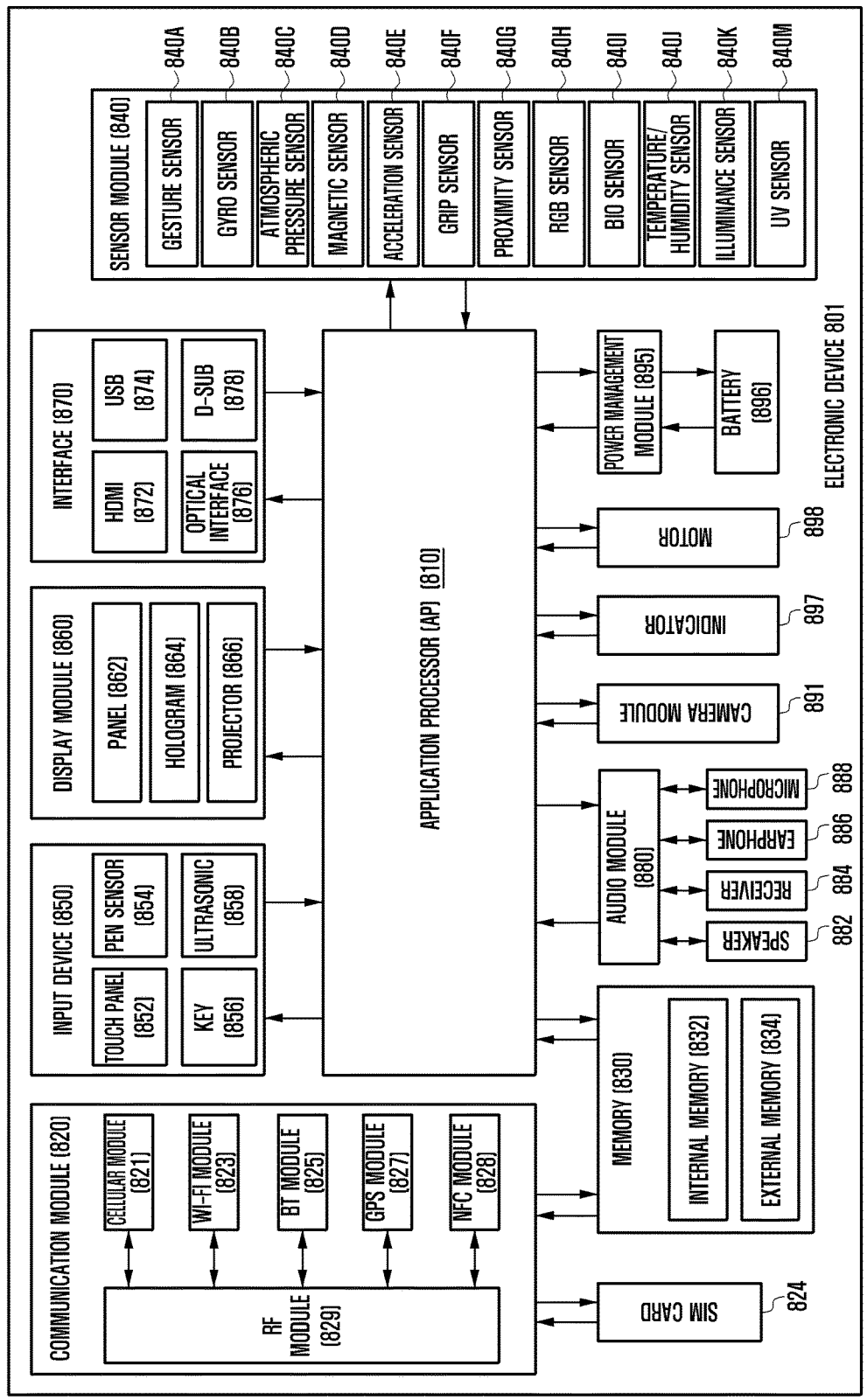
FIG. 8 is a block diagram of an electronic device according to various embodiments of the present disclosure.

FIG. 8 is a block diagram illustrating a configuration of an electronic device according to various embodiments of the present disclosure. The electronic device illustrated in FIG. 8 may be of the entirety or a part of the electronic device 701 illustrated in FIG. 7.

Referring to FIG. 8, the electronic device 801 may include an Application Processor (AP) 810, a communication module 820, a Subscriber Identity Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 may operate an OS and/or application programs to control a plurality of hardware and/or software components connected to the AP 810 and perform data-processing and operations on multimedia data. For example, the AP 810 may be implemented in the form of a System on Chip (SoC). According to an embodiment, the AP 810 may include a Graphic Processing Unit (GPU) (not shown).

The communication module 820 (e.g., communication interface 160) may perform data communication with another electronic device (e.g., the electronic device 704, the server 706, etc.) through a network. According to an embodiment, the communication module 820 may include a cellular module 821, a Wi-Fi module 823, a BT module 825, a GPS module 827, an NFC module 828, and a Radio Frequency (RF) module 829

The cellular module 821 is responsible for voice and video communication, text messaging, and Internet access services through a communication network (e.g., LTE, LTE-A, CDMA, WCDMA, UMTS, WiBro, and GSM networks). The cellular module 821 may perform identification and authentication of electronic devices in the communication network using the SIM card 824. According to an embodiment, the cellular module 821 may perform at least one of the functions of the AP 810. For example, the cellular module 821 may perform at least a part of the multimedia control function.

According to an embodiment, the cellular module 821 may include a Communication Processor (CP). The cellular module 821 may be implemented in the form of an SoC. Although the cellular module 821 (e.g., communication processor), the memory 830, and the power management module 895 are depicted as independent components separated from the AP 810, the present disclosure is not limited thereto but may be embodied in a way that the AP includes at least one of the components (e.g., cellular module 821).

According to an embodiment, each of the AP 810 and the cellular module 821 (e.g., communication processor) may load a command or data received from at least one of the components on a non-volatile or volatile memory and process the command or data. The AP 810 or the cellular module 821 may store the data received from other components or generated by at least one of other components in the non-volatile memory.

Each of the Wi-Fi module 823, the BT module 825, the GPS module 827, and the NFC module 828 may include a processor for processing the data it transmits/receives. Although the cellular module 821, the Wi-Fi module 823, the BT module 825, the GPS module 827, and the NFC module 828 are depicted as independent blocks, at least two of them (e.g., a communication processor corresponding to the cellular module 821 and a Wi-Fi processor corresponding to the Wi-Fi module 823) may be integrated in the form of an SoC.

The RF module 829 is responsible for data communication, e.g., transmitting/receiving RF signals. Although not depicted, the RF module 829 may include a transceiver, a Power Amplifier Module (PAM), a frequency filter, and a Low Noise Amplifier (LNA). The RF module 829 also may include the elements for transmitting/receiving an electric wave in free space, e.g., conductor or conductive wire. Although FIG. 8 is directed to the case where the Wi-Fi module 823, the BT module 825, the GPS module 827, and the NFC module 828 are sharing the RF module 829, the present disclosure is not limited thereto but may be embodied in a way that at least one of the Wi-Fi module 823, the BT module 825, the GPS module 827, and the NFC module 828 transmits/receives RF signals using an independent RF module.

The SIM card 824 may be designed so as to be inserted into a slot formed at a predetermined position of the electronic device. The SIM card 824 may store unique identity information (e.g. Integrated Circuit Card Identifier (ICCID)) or subscriber information (e.g. International Mobile Subscriber Identity (IMSI)).

The memory 830 (e.g., memory 130) may include at least one of an internal memory 832 and an external memory 834. The internal memory 832 may include at least one of a volatile memory (e.g., Dynamic Random Access Memory (DRAM), Static RAM (SRAM), Synchronous Dynamic RAM (SDRAM) or a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 832 may be a Solid State Drive (SSD). The external memory 834 may be a flash drive such as Compact Flash (CF), Secure Digital (SD), micro-SD, Mini-SD, extreme Digital (xD), and Memory Stick. The external memory 834 may be connected to the electronic device 801 through various interfaces functionally. According to an embodiment, the electronic device 801 may include a storage device (or storage medium) such as hard drive.

The sensor module 840 may measure a physical quantity or check the operation status of the electronic device 801 and convert the measured or checked information to an electric signal. The sensor module 840 may include at least one of a gesture sensor 840A, a Gyro sensor 840B, an atmospheric pressure sensor 840C, a magnetic sensor 840D, an acceleration sensor 840E, a grip sensor 840F, a proximity sensor 840G, a color sensor 840H (e.g. Red, Green, Blue (RGB) sensor), a bio sensor 840I, a temperature/humidity sensor 840J, an illuminance sensor 840K, and an Ultra Violet (UV) sensor 840M. Additionally or alternatively, the sensor module 840 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 840 may further include a control circuit for controlling at least one of the sensors included therein.

The input device 850 may include a touch panel 852, a (digital) pen sensor 854, keys 856, and an ultrasonic input device 858. The touch panel 852 may be one of a capacitive, a resistive, an infrared, and a microwave type touch panel. The touch panel 852 may include a control circuit. In the case of the capacitive type touch panel, it is possible to detect physical contact or approximation. The touch panel 852 may further include a tactile layer. In this case, the touch panel 852 may provide the user with a haptic reaction or feedback.

The (digital) pen sensor 854 may be implemented with a sheet in the same or similar way as a touch input of the user or a separate recognition sheet. The keys 856 may include physical buttons, an optical key, a keypad, etc. The ultrasonic input device 858 is a device capable of checking data by detecting a sound wave through a microphone 888 and may be implemented for wireless recognition. According to an embodiment, the electronic device 801 may receive the user input made by means of an external device (e.g., a computer or a server) connected through the communication module 820.

The display 860 (e.g., the display module 150) may include a panel 862, a hologram device 864, and a projector 866. The panel 862 may be a Liquid Crystal Display (LCD) panel or an Active Matrix Organic Light Emitting Diodes (AMOLED) panel. The panel 862 may be implemented so as to be flexible, transparent, and/or wearable. The panel 862 may be implemented as a module integrated with the touch panel 852. The hologram device 864 may present a 3-dimensional image in the air using interference of light. The projector 866 may project an image to a screen. The screen may be placed inside or outside of the electronic device. According to an embodiment, the display 860 may include a control circuit for controlling the panel 862, the hologram device 864, and the projector 866.

The interface 870 may include an HDMI 872, a USB 874, an optical interface 876, and a D-subminiature (D-sub) 878. The interface 870 may include the communication interface 160 as shown in FIG. 1. Additionally or alternatively, the interface 870 may include a Mobile High-definition Link (MHL) interface, a SD/MMC card interface, and infrared Data Association (irDA) standard interface.

The audio module 880 may convert sound to an electric signal and vice versa. At least a part of the audio module 880 may be included in the input/output interface 140 as shown in FIG. 1. The audio module 880 may process the audio information input or output through a speaker 882, a receiver 884, an earphone 886, and the microphone 888.

The camera module 891 is a device capable of taking still and motion pictures and, according to an embodiment, includes at least one image sensor (e.g., a front sensor, a rear sensor, etc.), a lens (not shown), an Image Signal Processor (ISP) (not shown), and a flash (e.g., an LED or a xenon lamp) (not shown).

The power management module 895 may manage the power of the electronic device 801. Although not shown, the power management module 895 may include a Power Management Integrated Circuit (PMIC), a charger Integrated Circuit (IC), a battery, and a battery or fuel gauge.

The PMIC may be integrated into an integrated circuit or an SoC semiconductor. The charging may be classified into wireless charging and wired charge. The charger IC may charge the battery and protect the charger against overvoltage or overcurrent. According to an embodiment, the charger IC may include at least one of a wired charger and/or a wireless charger IC. Examples of wireless charging technology include resonance wireless charging and electromagnetic wave wireless charging, and there is a need of extra circuit for wireless charging such as a coil loop, a resonance circuit, a diode, etc.

The battery gauge may measure the residual power of the battery 896, a charging voltage, a current, a temperature, etc. The battery 896 may store or generate power and supply the stored or generated power to the electronic device 801. The battery 896 may include a rechargeable battery or a solar battery.

The indicator 897 may display an operation status of the electronic device 801 or a part of the electronic device, a booting status, a messaging status, a charging status, etc. The motor 898 may convert the electronic signal to a mechanical vibration. Although not shown, the electronic device 801 may include a processing unit (e.g., a GPU) for supporting mobile TV. The processing unit for supporting the mobile TV may be able to process the media data abiding by the broadcast standards such as Digital Multimedia Broadcasting (DMB), Digital Video Broadcasting (DVB), media flow, etc.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to various embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of a component or a part thereof. The term "module" may be the smallest unit of performing at least one function or a part thereof. A module may be implemented mechanically or electronically. For example, a module may include at least one of an Application-Specific Integrated Circuit (ASIC) chip, a Field-Programmable Gate Array (FPGA), and a Programmable-Logic Device known or to be developed for certain operations.

According to various embodiments of the present disclosure, the devices (e.g., modules or their functions) or methods may be implemented by computer program instructions stored in a computer-readable storage medium. In the case that the instructions are executed by at least one processor (e.g., the processor 120), the at least one processor may execute the functions corresponding to the instructions. The computer-readable storage medium may be the memory 130. At least a part of the programing module may be implemented (e.g., executed) by the processor 120. At least part of the programing module may include modules, programs, routines, sets of instructions, and processes for executing the at least one function.

The computer-readable storage medium includes magnetic media such as a floppy disk and a magnetic tape, optical media including a Compact Disc (CD) ROM and a DVD ROM, a magneto-optical media such as a floptical disk, and the hardware device designed for storing and executing program commands such as ROM, RAM, and flash memory. The program commands include the language code executable by computers using the interpreter as well as the machine language codes created by a compiler. The aforementioned hardware device can be implemented with one or more software modules for executing the operations of the various embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for processing biometric information, the electronic device comprising:
    a display;
    a fingerprint sensor; and
    a processor operable in one of a trusted execution environment or a rich execution environment, the processor being coupled with the fingerprint sensor via a secure interface, wherein the processor is configured to:
        in response to receiving a signal from the fingerprint sensor while the processor is operating in the rich execution environment, switch from the rich execution environment to the trusted execution environment and obtain, in the trusted execution environment, through the secure interface, raw image data directly from the fingerprint sensor, the signal being generated by the fingerprint sensor when the fingerprint sensor senses a fingerprint object,
        generate, in the trusted execution environment, biometric data based on the raw image data, and
        perform, in the trusted execution environment, biometric authentication based on the generated biometric data,
    wherein the raw image data from the fingerprint sensor is accessible through the secure interface by the processor while the processor is operating in the trusted execution environment,
    wherein the raw image data is not accessible by the processor while the processor is operating in the rich execution environment,
    wherein a rich operating system is used while the processor operates in the rich execution environment, and
    wherein a secure operating system is used while the processor operates in the trusted execution environment.

2. The electronic device of claim 1,
    wherein the processor is further configured to,
    when the biometric authentication is complete, control, in the rich execution environment, the display to display a user interface based on a result of the biometric authentication.

3. The electronic device of claim 2, wherein the processor is further configured to:
    transfer, in the trusted execution environment, the result of the biometric authentication to the rich execution environment, and
    obtain, in the rich execution environment, the result.

4. The electronic device of claim 1, further comprising:
    at least one memory including a normal zone and a secure zone,
    wherein the processor is further configured to, in the rich execution environment, access the normal zone and not to access the secure zone.

5. The electronic device of claim 4, wherein the processor is further configured to access, in the trusted execution environment, the normal zone and the secure zone.

6. The electronic device of claim 4, wherein the processor is further configured to:
    perform, in the trusted execution environment, biometric registration based on the generated biometric data, and
    store the generated biometric data in the secure zone of the at least one memory.

7. The electronic device of claim 6, wherein, to perform the biometric authentication, the processor is further configured to match the generated biometric data with the stored biometric data.

8. The electronic device of claim 1, wherein the processor is further configured to, while operating in the trusted execution environment:
    calculate a characteristic from the raw image data obtained from the fingerprint sensor,
    generate the biometric data based on the characteristic, and
    encrypt the biometric data by a unique key created based on a unique identifier.

9. The electronic device of claim 8, wherein the processor is further configured to, while operating in the trusted execution environment:
    obtain encrypted registration data from at least one memory, allocated as a normal zone or a secure zone,
    decrypt the encrypted registration data by the unique key generated based on the unique identifier,
    compare the decrypted registration data with the generated biometric data, and
    determine whether or not the biometric authentication is successful based on the comparison between the decrypted registration data and the generated biometric data.

10. The electronic device of claim 6, wherein the processor is further configured to determine, in the rich execution environment, the result of the biometric authentication using a true-false-type based on the biometric registration or the biometric authentication.

11. The electronic device of claim 8, wherein the processor is further configured to, while operating in the trusted execution environment:
    generate pseudo-data from the biometric data by using a transformation function,
    encrypt the pseudo-data, and
    store the encrypted pseudo-data as registration data.

12. The electronic device of claim 11, wherein the processor is further configured to perform, in the trusted execution environment, the biometric authentication based on the pseudo-data.

13. The electronic device of claim 11, wherein the transformation function uses a value provided in the trusted execution environment or by separate secure hardware.

14. The electronic device of claim 11, wherein the processor is further configured to change, in the trusted execution environment, the transformation function when the biometric data is disclosed.

15. An electronic device for processing biometric information, the electronic device comprising:
    a display;
    a fingerprint sensor; and
    a processor, coupled to the display and the fingerprint sensor, operable in one of a trusted execution environment or a rich execution environment, wherein the processor is configured to:
        based on a determination that an event is triggered by the fingerprint sensor while operating in the rich execution environment, the event being triggered when the fingerprint sensor senses a fingerprint object;
switch from the rich execution environment to the trusted execution environment,
obtain, in the trusted execution environment, through a secure interface, raw image data directly from the fingerprint sensor, the fingerprint sensor generating the raw image data by sensing the fingerprint object,
generate, in the trusted execution environment, biometric data based on the raw image data, and
perform, in the trusted execution environment, biometric enrollment based on the generated biometric data, and
based on a determination that the biometric enrollment is complete, transfer a result of the biometric enrollment from the trusted execution environment to the rich execution environment,
wherein the raw image data from the fingerprint sensor is accessible through the secure interface by the processor while the processor is operating in the trusted execution environment,
wherein the raw image data is not accessible by the processor while the processor is operating in the rich execution environment,
wherein a rich operating system is used while the processor operates in the rich execution environment, and
wherein a secure operating system is used while the processor operates in the trusted execution environment.

16. The electronic device of claim 15, further comprising:
at least one memory including a normal zone and a secure zone,
wherein the normal zone is accessible while the secure zone is not accessible by the processor operating in the rich execution environment, and
wherein the normal zone and the secure zone are accessible by the processor operating in the trusted execution environment.

17. The electronic device of claim 16, wherein the processor is further configured to perform the biometric enrollment by storing the generated biometric data in the secure zone.

18. The electronic device of claim 16, wherein the processor is further configured to perform the biometric enrollment by encrypting the generated biometric data and storing the encrypted generated biometric data in the normal zone.

19. The electronic device of claim 17, wherein the processor is further configured to:
based on a second determination that a second event is triggered by the fingerprint sensor while operating in the rich execution environment, the second event being triggered when the fingerprint sensor senses a fingerprint object,
obtain, in the trusted execution environment, through the secure interface, second raw image data directly from the fingerprint sensor, the fingerprint sensor generating the second raw image data by sensing the fingerprint object,
generate, in the trusted execution environment, second biometric data based on the raw image data, and
perform, in the trusted execution environment, biometric authentication by comparing the second generated biometric data and the stored generated biometric data, and
based on a determination that the biometric authentication is complete, transfer a result of the biometric authentication from the trusted execution environment to the rich execution environment.

20. The electronic device of claim 15, wherein the processor is further configured to, while operating in the trusted execution environment:
calculate a characteristic from the raw image data obtained from the fingerprint sensor,
generate the biometric data based on the characteristic, and
encrypt the biometric data by a unique key created based on a unique identifier.

21. The electronic device of claim 20, wherein the processor is further configured to, while operating in the trusted execution environment:
obtain encrypted registration data from at least one memory, allocated as a normal zone or a secure zone,
decrypt the encrypted registration data by the unique key generated based on the unique identifier,
compare the decrypted registration data with the generated biometric data, and
determine whether or not biometric authentication is successful based on the comparison between the decrypted registration data and the generated biometric data.

22. The electronic device of claim 19, wherein the processor is further configured to determine, in the rich execution environment, the result of the biometric authentication using a true-false-type based on the biometric enrollment or the biometric authentication.

23. The electronic device of claim 19, wherein the processor is further configured to, while operating in the trusted execution environment:
generate pseudo-data from the biometric data by using a transformation function,
encrypt the pseudo-data, and
store the encrypted pseudo-data as registration data.

24. The electronic device of claim 23, wherein the processor is further configured to perform, in the trusted execution environment, the biometric authentication based on the pseudo-data.

25. The electronic device of claim 23, wherein the transformation function uses a value provided in the trusted execution environment or by separate secure hardware.

26. The electronic device of claim 23, wherein the processor is further configured to change, in the trusted execution environment, the transformation function when the biometric data is disclosed.

* * * * *